(12) United States Patent
Wagner

(10) Patent No.: US 7,066,073 B1
(45) Date of Patent: Jun. 27, 2006

(54) VACUUM BRAKE BOOSTER FOR MOTOR VEHICLES

(75) Inventor: Wilfried Wagner, Huttenberg (DE)

(73) Assignee: ITT Automotive Europe GmbH, Frankfurt (DE)

( * ) Notice: Subject to any disclaimer, the term of this patent is extended or adjusted under 35 U.S.C. 154(b) by 0 days.

(21) Appl. No.: 08/676,299

(22) PCT Filed: Nov. 18, 1995

(86) PCT No.: PCT/EP95/04507

§ 371 (c)(1),
(2), (4) Date: Sep. 19, 1996

(87) PCT Pub. No.: WO96/15930

PCT Pub. Date: May 30, 1996

(30) Foreign Application Priority Data

Nov. 18, 1994 (DE) .............................. P 44 41 149

(51) Int. Cl.
*F15B 9/10* (2006.01)

(52) U.S. Cl. .................................................. 91/376 R

(58) Field of Classification Search ............... 91/376 R
See application file for complete search history.

(56) References Cited

U.S. PATENT DOCUMENTS

| | | | | |
|---|---|---|---|---|
| 5,546,846 A | * | 8/1996 | Bauer ....................... | 91/376 R |
| 5,564,325 A | * | 10/1996 | Satoh ....................... | 91/376 R |
| 5,605,088 A | * | 2/1997 | Balz et al. ................ | 91/376 R |

FOREIGN PATENT DOCUMENTS

| | | |
|---|---|---|
| DE | 40 2 13 04 | 1/1992 |
| DE | 42 2 78 79 | 2/1994 |
| DE | 4 23 83 33 | 5/1994 |

* cited by examiner

*Primary Examiner*—F. Daniel Lopez
(74) *Attorney, Agent, or Firm*—Thomas N. Twomey; J. Gordon Lewis

(57) ABSTRACT

In order to minimize the vacuum-dependent force component acting upon the valve body of a vacuum brake booster that is equipped with a pneumatically pressure-compensated control valve without requiring constructive modifications of the valve gear casing that accommodates the control valve, the invention includes a radially inner limit as well as the radially outer limit of a pressure compensation chamber in the valve gear casing, which is limited by the valve body, is formed by a guide part that guides the valve body.

8 Claims, 2 Drawing Sheets

VACUUM BRAKE BOOSTER FOR MOTOR VEHICLES

TECHNICAL FIELD

The invention relates to a vacuum brake booster for motor vehicles.

BACKGROUND OF THE INVENTION

One vacuum brake booster of this general type is, for example, known from DE-OS 42 27 479 A1. The valve body of this known brake booster, which is prestressed in the direction of the sealing seats by means of a valve spring, is provided with passages within the region of its sealing surface. These passages originate at an annular chamber that is connected to the work chamber and end in the pneumatic chamber, namely on the side of the valve body that faces away from the sealing seats. Consequently, a continuous pressure compensation takes place between this chamber and the work chamber. In this case, the valve body has two pneumatically effective surfaces. The first effective surface or annular surface is limited by the radially inner sealing seat (atmospheric sealing seat) of the control valve as well a radially inner sealing lip of the valve body which cooperates with the guide part that limits the pneumatic chamber. Consequently, this effective surface or annular surface is subjected to a pneumatic differential pressure between the atmospheric pressure and the vacuum that exists in the pneumatic chamber in the release position. This results in a force component that is directed opposite to the force generated by the valve spring and decreases during the actuation of the brake booster as the degree of ventilation of the pneumatic chamber increases, namely until said force component is reduced to zero once the control point of the brake booster is reached or the work chamber is entirely ventilated, i.e., the first annular surface is pressure-compensated.

The second effective surface or annular surface is limited by the radially outer sealing seat (vacuum sealing seat) of the control valve as well as a radially outer sealing lip of the valve body which cooperates with the inner wall of the valve gear casing which limits the pneumatic chamber, i.e., this effective surface or annular surface is pressure-compensated in the release position of the brake booster and subjected to a pneumatic differential pressure when the brake booster is actuated. Consequently, a vacuum-dependent force component that boosts the effect of the aforementioned valve spring is generated.

However, one disadvantage associated with previously disclosed vacuum brake boosters is that constructive modifications in the valve gear casing are required for minimizing the vacuum-dependent sealing force component that occurs when higher actuation forces are applied.

The present invention make it possible to minimize the aforementioned sealing force component without requiring constructive modifications of the valve gear casing.

According to the invention, this objective is attained by forming the radially outer limitation of the pneumatic chamber by the guide part.

According to one additional advantageous development of the invention in which the valve body comprises a radially outer sealing lip as well as a radially inner sealing lip, and in which the radially inner sealing lip cooperates with an inner, tubular region of the guide part, it is proposed that the radially outer sealing lip cooperates with a radially outer region of the guide part, which is realized as a cylinder and radially adjoins the valve gear casing.

One additional advantageous embodiment of the invention in which the valve body comprises a first annular surface that is limited by the radially inner sealing lip and the radially inner sealing seat as well as a second annular surface that is limited by the radially outer sealing lip and the radially outer sealing seat is characterized by the fact that both annular surfaces have the same size. Due to this measure, the vacuum brake booster according to the invention behaves in a pressure-compensated fashion, in particular, in its moderate operating range, namely because the forces that act in opposite directions are neutralized.

Another advantageous embodiment of the object of the invention is characterized by the fact that the first annular surface is larger than the second annular surface. This embodiment is particularly advantageous in the realization of control valves that can be controlled proportionally and, for example, are used in brake boosters that are actuated independently or electromechanically.

In this case, it is advantageous if the guide part is made of plastic or metal.

A simplification in the assembly of the control components in which the guide part is sealed relative to the valve gear casing by means of a ring seal can be attained with one additional embodiment in which the ring seal is arranged in a radial groove in the guide part.

A reduction of the axial length, in particular, the axial length of the brake booster control components in which an air filter, as well as a readjusting spring that prestresses the radially inner sealing seat (atmospheric sealing seat) opposite the actuating direction, is arranged within the air intake region of the valve gear casing, can be attained if the air filter axially adjoins the guide part and the readjusting spring is realized as a cylinder and arranged radially outside as well as coaxial to the air filter.

DETAILED DESCRIPTION OF THE PREFERRED EMBODIMENTS

Figure 1:
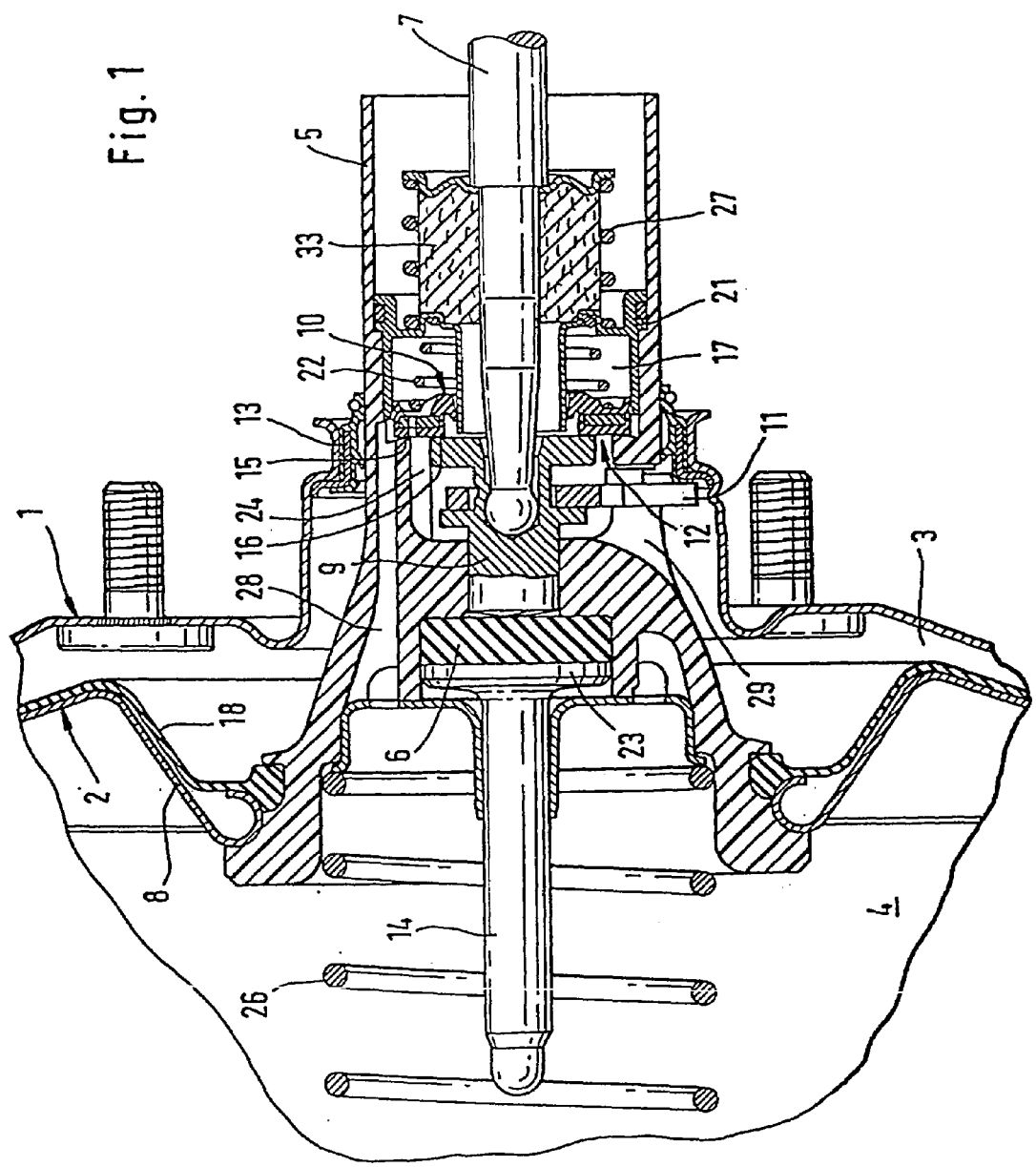
FIG. 1 is a partial longitudinal section through the vacuum brake booster of the present invention.

The schematically illustrated booster housing 1 of the vacuum brake booster according to the invention shown in FIG. 1 is divided into a work chamber 3 and a vacuum chamber 4 by means of an axially movable wall 2. The axially movable wall 2 consists of a deep-drawn diaphragm disk 8 and a flexible membrane 18 that adjoins the diaphragm disk. This flexible membrane forms a roll-type membrane seal between the outer circumference of the diaphragm disk 8 and the booster housing 1.

A control valve 12 that is actuated by means of an actuating rod 7 is accommodated in a valve gear casing 5 that carries the movable wall 2 and is guided in the booster housing 1 in a sealed fashion. This control valve consists of a first sealing seat 15 that is arranged on the valve gear casing 5, a second sealing seat 16 that is arranged on a valve piston 9 that is connected to the actuating rod 7, as well as an annular valve body 10 that cooperates with both sealing seats 15,16. This valve body is guided in a guide part 21 that is arranged in the valve gear casing 5 in a sealed fashion and pressed against the sealing seats 15,16 by means of a valve spring 22 that is supported on the guide part 21. The work chamber 3 can be connected to the vacuum chamber 4 by way of channels 28 that extend laterally in the valve gear casing 5.

The brake force is transmitted to the actuating piston of a master cylinder (not shown) of the brake system by way of an elastic reaction disk 6 that adjoins the base of the valve gear casing 5 as well as a plunger rod 14 that comprises a top flange 23. The master cylinder of the brake system is arranged on the vacuum side of the vacuum brake booster. The force introduced by way of the actuating rod 7 is transmitted to the reaction disk 6 by means of the valve piston 9.

A readjusting spring 26 that is schematically illustrated in FIG. 1 and supported on the face wall of the booster housing 1 on the vacuum side, namely on a flange (not shown), holds the movable wall 2 in the normal position shown. In addition, a piston rod pull-back spring 27 that is arranged between the actuating rod 7 and the guide part 21 such that it radially encompasses an air filter 33 that axially adjoins the guide part 21 is provided. The force of this piston rod pull-back spring ensures a certain prestress of the valve piston 9 or its sealing seat 16 relative to the valve body 10.

In order to connect the work chamber 3 to the atmosphere during the actuation of the control valve 12, a channel 29 that approximately extends radially is arranged in the valve gear casing 5. The return movement of the valve piston 9 at the end of a brake maneuver is limited by a transverse element 11 that, in the release position of the vacuum brake booster shown in the figures, adjoins a sliding ring seal 13 which guides the valve gear casing 5 in the booster housing 1 in a sealed fashion.

The figures also show that the valve body 10 limits a pneumatic chamber 17 in the guide part 21. This pneumatic chamber is connected to an annular chamber 24 that is limited by the sealing seats 15,16 by way of passages 19 (FIG. 2) arranged in the valve body 10. The aforementioned pneumatic channels 29 end in this annular chamber such that the pneumatic chamber 17 formed on the side of the valve body 10 that faces away from the sealing surface 20 is continuously connected to the work chamber 3, i.e., the valve body 10 is pressure-compensated.

Figure 2:
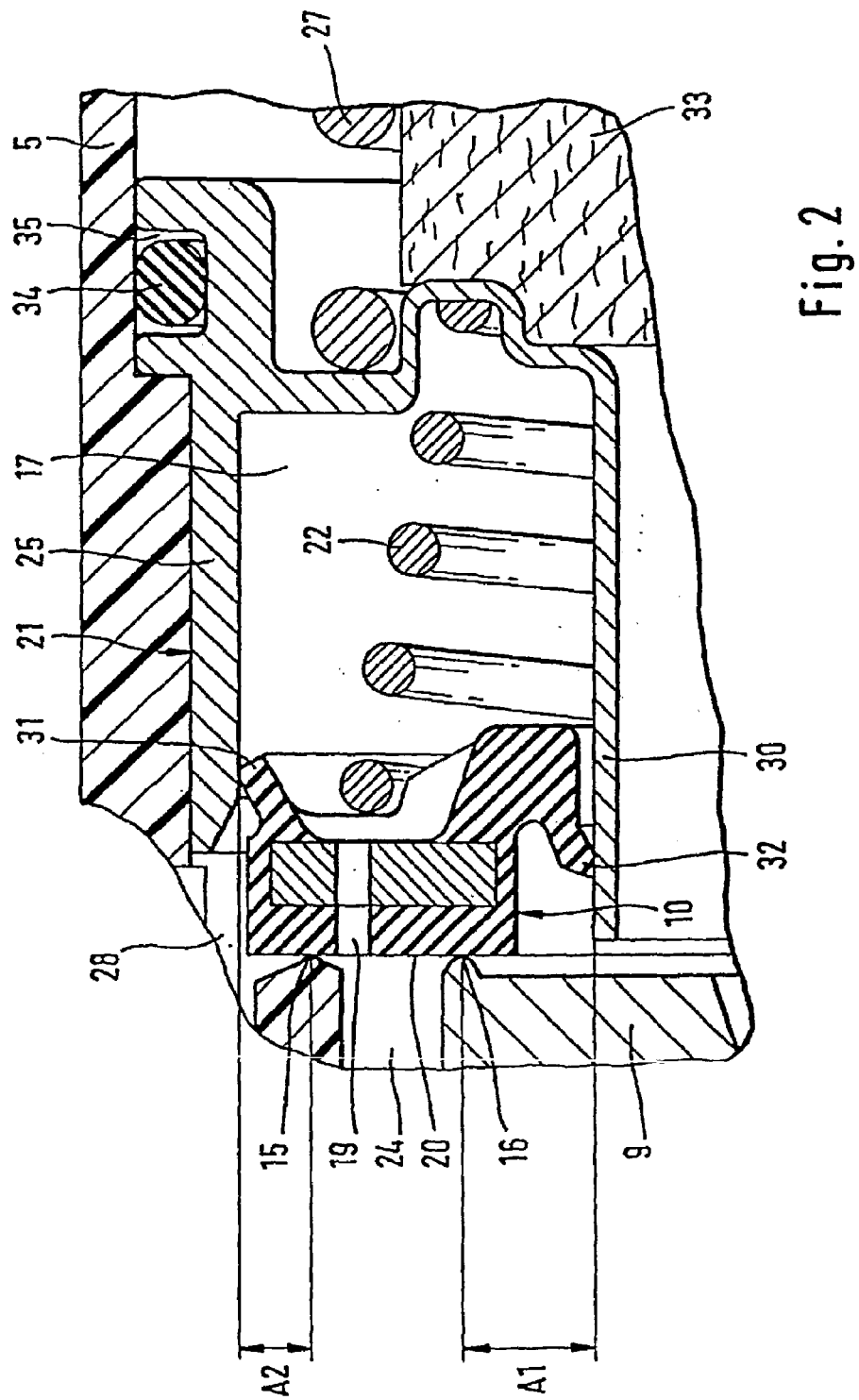
FIG. 2 is and enlarged, partial cross sectional view of the control components of the vacuum brake booster of FIG. 1.

FIG. 2 shows that the valve body 10 comprises a radially outer first sealing lip 31 that adjoins a cylindrical, radially outer region 25 of the guide part 21 in a sealed fashion as well as a radially inner second sealing lip 32 that cooperates with a tubular, radially inner region 30 of the guide part 21. A ring seal 34 that is arranged in a circumferential radial groove 35 of the guide part 21 effectively seals the guide part 21 relative to the valve gear casing 5.

In the release position shown in FIG. 2, the pressure in the vacuum channels 28, the annular chamber 24, and the pneumatic pressure compensation chamber 17 is approximately identical or corresponds to the vacuum that exists in the vacuum chamber 4. The valve spring 22 generates the force required for pressing the valve body 10 against the sealing seats 15,16. Since atmospheric pressure exists in the chamber that is limited by the valve piston 9, as well as the radially inner region of the valve body 10, a pneumatic differential pressure acts upon the first annular surface A1 of the valve body 10 between an imaginary circle corresponding to points opposite the second (atmospheric) sealing seat 16 and the radially inner sealing lip 32. Consequently, a force component which counteracts the sealing force generated by the valve spring 22 and depends on the vacuum in the pressure compensation chamber 17 is generated.

During the actuation of the brake booster, i.e., when the second sealing seat 16 is lifted off the valve body 10 and the work chamber 3 is ventilated, the pressure compensation chamber 17 is simultaneously ventilated such that a pneumatic differential pressure acts upon the second annular surface A2 of the valve body 10 between an imaginary circle corresponding to points opposite the first (vacuum) sealing seat 15 and the radially outer sealing lip 31. Consequently, a force component that is directed toward the sealing seats 15,16 and boosts the effect of the valve spring 22 is generated. During the continued ventilation of the pressure compensation chamber 17, the force component that acts upon the first annular surface A1 decreases until it is reduced to zero once the control point of the brake booster is reached or the brake booster is entirely ventilated.

The previous description indicates that the behavior of the vacuum brake booster according to the invention can be influenced by suitably adapting the two annular surfaces A1 and A2. For example, if both annular surfaces A1 and A2 have the same size, a pressure-compensated behavior of the brake booster is attained within the moderate range of the actuating forces, namely due to the fact that both force components are neutralized. However, if the radially outer annular surface A2 is larger than the first annular surface A1, a proportional control of the control valve 12, which is particularly practical in independently or electromagnetically actuated brake boosters, can be attained.

The invention claimed is:

1. Vacuum brake booster for motor vehicles, including a booster housing, an interior of which is divided into a vacuum chamber and a work chamber by means of a movable wall, and a control valve that controls a differential pressure acting upon said movable wall and which is arranged in a valve gear casing that carries said movable wall, comprising: concentric radially inner and outer annular sealing seats arranged on said control valve; a pneumatic chamber in said valve gear casing which is fluidly connected to said work chamber; and an annular valve body guided in a guide part, wherein said guide part is arranged in said valve gear casing in a sealed fashion; and wherein said guide part forms radially inner and outer surfaces of said pneumatic chamber, and said annular valve body forms a portion of said pneumatic chamber.

2. Vacuum brake booster according to claim 1, wherein said annular valve body comprises a radially outer sealing lip and a radially inner sealing lip, wherein said radially inner sealing lip cooperates with a tubular, radially inner region of said guide part, and wherein said radially outer sealing lip cooperates with a cylindrical, radially outer region of said guide part which radially adjoins said valve gear casing.

3. Vacuum brake booster according to claim 2, wherein said valve body comprises first and second imaginary circles corresponding to points opposite said radially inner and outer annular sealing seats, respectively; wherein a first annular surface is defined by said radially inner sealing lip and said first circle, a second annular surface is defined by said radially outer sealing lip and said second circle, and both annular surfaces have a same surface area.

4. Vacuum brake booster according to claim 2, wherein said valve body comprises first and second imaginary circles corresponding to points opposite said radially inner and outer annular sealing seats, respectively; wherein a first annular surface is defined by said radially inner sealing lip and said first circle, a second annular surface is defined by said radially outer sealing lip and said second circle, and an area of said first annular surface is larger than an area of said second annular surface.

5. Vacuum brake booster according to claim 1, wherein said guide part is made of plastic.

6. Vacuum brake booster according to claim 1, wherein said guide part is made of metal.

7. Vacuum brake booster according to claim 1, wherein said guide part includes a radial groove and a ring seal disposed therein.

8. Vacuum brake booster according to claim 1, further including an air filter, a readjusting spring that prestresses said radially inner sealing seat opposite an actuating direction, wherein said air filter is arranged within an air intake region of said valve gear casing, and wherein said air filter adjoins said guide part, and said readjusting spring is formed in a shape of a cylinder and is arranged radially outside of and coaxial to said air filter.

* * * * *